US010013434B2

(12) United States Patent
Sato

(10) Patent No.: US 10,013,434 B2
(45) Date of Patent: Jul. 3, 2018

(54) GEOGRAPHIC COORDINATE ENCODING DEVICE, METHOD, AND STORAGE MEDIUM, GEOGRAPHIC COORDINATE DECODING DEVICE, METHOD, AND STORAGE MEDIUM, AND TERMINAL UNIT USING GEOGRAPHIC COORDINATE ENCODING DEVICE

(71) Applicant: CASIO COMPUTER CO., LTD., Shibuya-ku, Tokyo (JP)

(72) Inventor: Kenji Sato, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 18 days.

(21) Appl. No.: 15/231,954

(22) Filed: Aug. 9, 2016

(65) Prior Publication Data

US 2017/0068689 A1    Mar. 9, 2017

(30) Foreign Application Priority Data

Sep. 7, 2015    (JP) ................................ 2015-175799

(51) Int. Cl.
*G06F 17/30* (2006.01)
*G01S 19/50* (2010.01)
*G01C 21/20* (2006.01)
*G01C 21/32* (2006.01)

(52) U.S. Cl.
CPC ....... *G06F 17/30241* (2013.01); *G01C 21/32* (2013.01); *G01S 19/50* (2013.01)

(58) Field of Classification Search
CPC .... G06F 17/30241; G01C 21/32; G01S 19/50

USPC ........................................................ 701/520
See application file for complete search history.

(56) References Cited

U.S. PATENT DOCUMENTS

| 2013/0054647 | A1  | 2/2013  | Terauchi |
|---|---|---|---|
| 2013/0238632 | A1* | 9/2013  | Urquhart ........... G06F 17/30241 707/747 |
| 2013/0262530 | A1* | 10/2013 | Collins ............. G06F 17/30312 707/812 |
| 2014/0278228 | A1* | 9/2014  | Agrawal ................ G01C 21/32 702/157 |
| 2014/0310162 | A1* | 10/2014 | Collins ............... G06F 3/04842 705/39 |

FOREIGN PATENT DOCUMENTS

JP    2013045319 A    3/2013

OTHER PUBLICATIONS

Teruki Ogawa, et al., "Proposal and Evaluation of a database system for processing using spatial statistics Geohash".

* cited by examiner

*Primary Examiner* — Atul Trivedi
(74) *Attorney, Agent, or Firm* — Holtz, Holtz & Volek PC

(57) ABSTRACT

A geographic coordinate encoding device including a processing unit, wherein the processing unit performs: a first encoding process of determining, from among a plurality of areas obtained by hierarchically dividing a geographic range, an area specified by geographic coordinates of at least two points detected by a sensor, and encoding data representing the determined area; and an output process of outputting data representing a relationship between the specified area and the coordinates of the at least two points, along with code data encoded by the first encoding process.

20 Claims, 7 Drawing Sheets

GEOGRAPHIC COORDINATE ENCODING DEVICE, METHOD, AND STORAGE MEDIUM, GEOGRAPHIC COORDINATE DECODING DEVICE, METHOD, AND STORAGE MEDIUM, AND TERMINAL UNIT USING GEOGRAPHIC COORDINATE ENCODING DEVICE

CROSS-REFERENCE TO RELATED APPLICATIONS

This application is based upon and claims the benefit of priority from the prior Japanese Patent Application No. 2015-175799, filed Sep. 7, 2015, and the entire contents of which are incorporated herein by reference.

BACKGROUND OF THE INVENTION

1. Field of the Invention

The present invention relates to a technology of encoding/decoding geographic coordinates such as latitude and longitude.

As terminal units such as smartphones equipped with a global positioning system (GPS) sensor have been widely used, terminal units configured to store geographic coordinates such as latitude and longitude obtained therefrom or transmit them to a server computer or the like via the Internet, as history (log) of terminal position information, are increasing.

Conventionally, in the case of storing or transmitting information of latitude and longitude, for example, to express (encode) information of each of latitude and longitude with sufficient precision, a data amount of about 32 bits is required each. As such, to express geographic coordinates of one point, a data amount of 32 bits×2=64 bits=8 bytes is required. If geographic coordinates of a thousand points are recorded, the required data amount is 8 bytes×1000=80000 bytes=about 80 kbytes.

Meanwhile, a technology of expressing geographic coordinates in a character string called Geohash has been known. Geohash expresses a pair of latitude and longitude in a character string. Geohash has a hierarchical structure from the left end character toward the right end character in a character string. The left end character indicates a rectangular area (first rectangular area) of the areas obtained by dividing the whole world into thirty-two areas, and the next character on the right side thereof indicates a rectangular area (second rectangular area) of the areas obtained by further dividing the first rectangular area into thirty-two areas. In this way, encoding is performed sequentially using characters so as to express a rectangular area of the areas obtained by dividing the area, divided according to the character string on the left side, into thirty two areas, toward the right. Accordingly, a character of one digit is a character selected from thirty-two pieces of half-width alphanumeric characters, which is expressed by 5-bit data by an encoding system called base 32. In this way, as the number of digits of a Geohash character string is larger, a rectangular area expressed thereby is decreased and the precision is higher. On the contrary, when the characters are deleted sequentially from the right end of a character string, a rectangular area expressed by Geohash is increased and the precision is lower. In this way, according to Geohash, it is possible to express a geographic range with arbitrary precision according to the number of digits of a character string. For example, in a twelve-digit Geohash character string, a 2 cm×3 cm rectangular area in the whole world can be expressed.

For example, JP 2013-045319 A discloses an information processor in which a pair of latitude and longitude is converted to Geohash, and according to the position information expressed by the Geohash, a user terminal existing in a geographic rectangular area of a predetermined size is searched.

To record or transmit position information of a terminal in real time as much as possible, the data amount of latitude and longitude increases. However, a data amount of 8 bytes is required to express geographic coordinates of one point, when the latitude and the longitude are encoded as they are. As such, in the case of recording or transmitting geographic coordinates per second, for example, a data amount of as much as 8 bytes×3600 seconds=28800 bytes is required per hour. This causes a problem that a memory of a terminal or a communication band is tightened.

On the other hand, the technology of expressing geographic coordinates by Geohash, described above, is characterized in that a geographic range can be expressed with arbitrary precision according to the number of digits of a character string. However, in the case of encoding latitude and longitude by a Geohash character string of twelve digits, as a character of one digit is expressed by 5 bits, 5 bits×12 digits=60 bits are required. As such, compared with the case of encoding latitude and longitude as they are (64 bits), no significant compression of information can be achieved.

SUMMARY OF THE INVENTION

In view of the above, an object of the present invention is to realize further compression of information of geographic coordinates by using Geohash.

An example of an aspect includes: a first encoding process of determining, from among a plurality of areas obtained by hierarchically dividing a geographic range, an area specified by geographic coordinates of at least two points detected by a sensor, and encoding data representing the determined area; and an output process of outputting data representing a relationship between the specified area and the coordinates of the at least two points, along with code data encoded by the first encoding process.

DETAILED DESCRIPTION OF THE PREPARED EMBODIMENT

Figure 1:
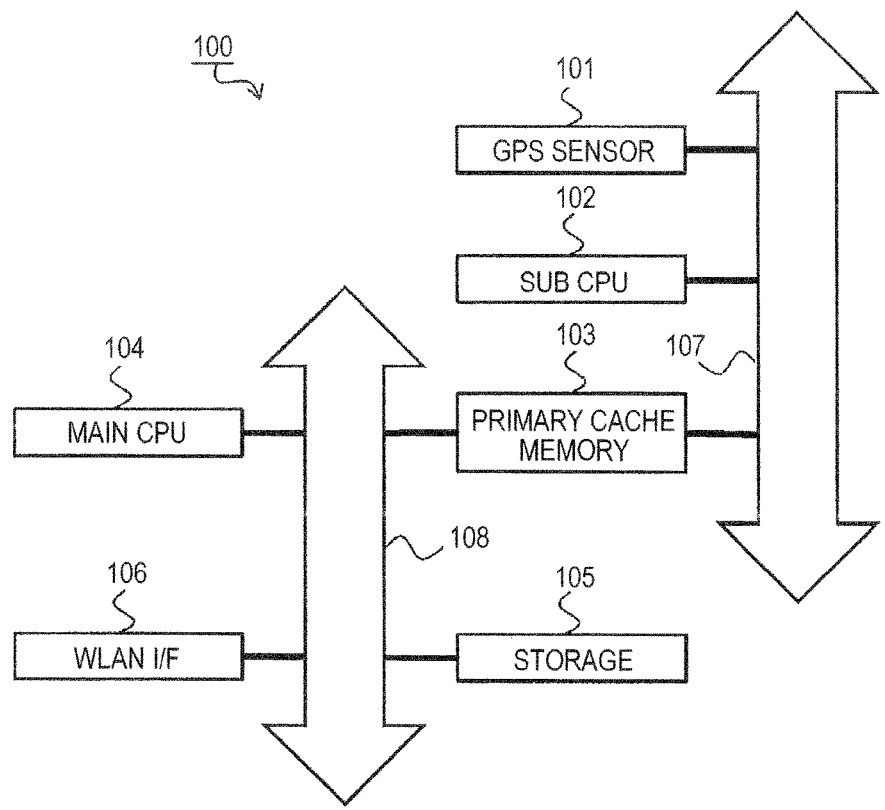
FIG. 1 is a diagram showing an exemplary hardware configuration of a terminal unit according to the present embodiment.

Hereinafter, an embodiment of the present invention will be described in detail with reference to the drawings. FIG. 1 is a diagram showing an exemplary hardware configuration of a terminal unit 100 according to the present embodiment. The terminal unit 100 includes a positioning sensor such as GPS, a sub central processing unit (sub CPU) 102, and a primary cache memory 103, which are connected with each other by a first bus 107. The terminal unit 100 also includes a main central processing unit (main CPU) 104, a primary cache memory 103, a storage 105, and a wireless local area network interface (WLAN I/F) 106, which are connected with each other by a second bus 108.

Figure 6:
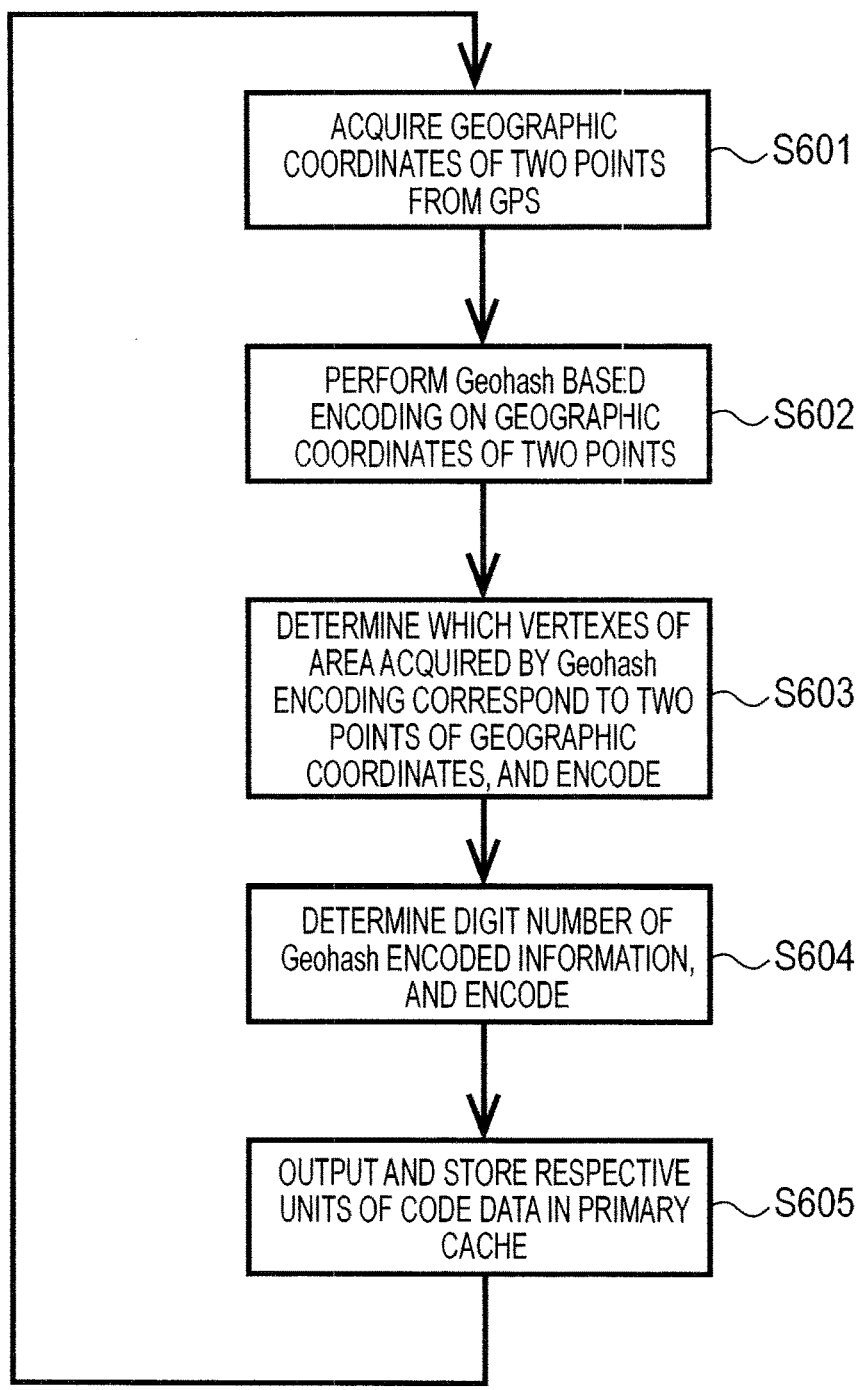
FIG. 6 is a flowchart illustrating an example of a geographic coordinate encoding process by a sub CPU.

The sub CPU 102 sequentially acquires latitude and longitude data, which is GPS data, from the positioning sensor 101 via the first bus 107 (step S601 in FIG. 6), encodes the latitude and longitude data by a geographic coordinate encoding process based on Geohash (steps S602 to S604 in FIG. 6), and accumulates the code data sequentially acquired consequently, in the primary cache memory 103 via the first bus 107 (step S605 in FIG. 6).

The main CPU 104 checks the content of the primary cache memory 103 via the second bus 108 at certain time intervals, and when there is code data, collectively move the code data to the storage 105 via the second bus 108, and then wirelessly transmits it from the storage 105 to a server computer, not shown, via the WLAN I/F 106.

Figure 2:
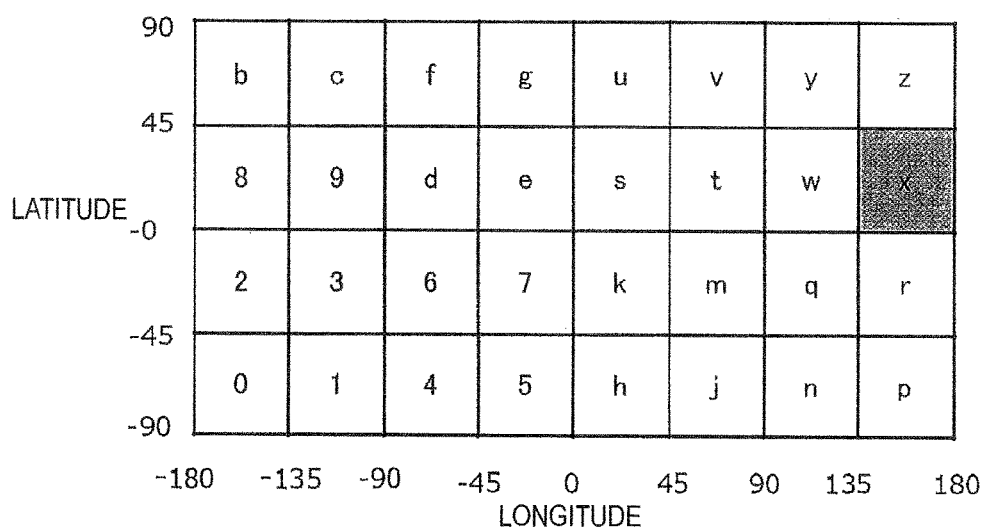
FIG. 2 is an explanatory diagram (part 1) of Geohash.
Figure 3:
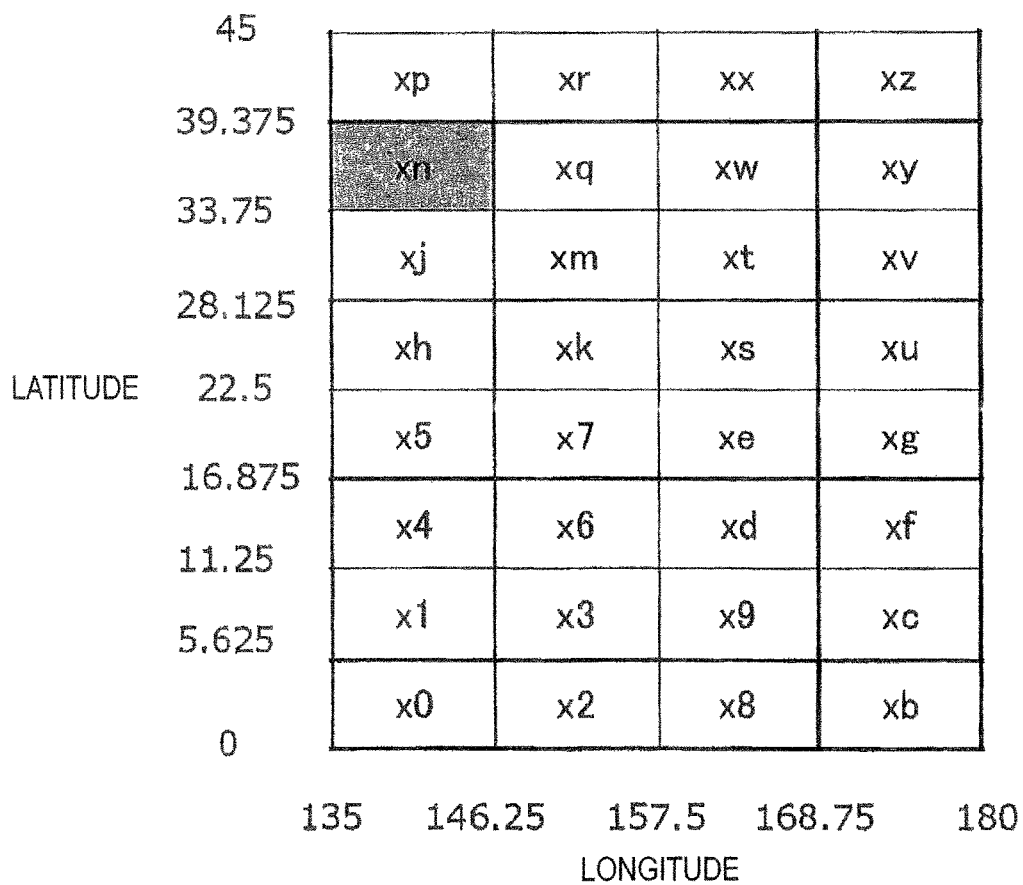
FIG. 3 is an explanatory diagram (part 2) of Geohash.

Next, a geographic coordinate encoding process based on the Geohash system, performed by the sub CPU 102, will be described. In the present embodiment, encoding by Geohash is adopted basically. FIGS. 2 and 3 are explanatory diagrams of Geohash.

In Geohash, first, a world map based on Mercator projection is divided into thirty two areas of wide (longitude)×8 and height (latitude)×4 as shown in FIG. 2, and then, a character among predetermined thirty-two half-width alphanumeric characters is assigned to each of the divided areas by an encoding system called base 32. In the example of FIG. 2, geographic coordinates represented by latitude 35.685 and longitude 139.75 in Tokyo are within the range of an area to which a character "x" is assigned (latitude 0 to 45, longitude 135 to 180) among the areas divided into thirty two at the first time, as shown in FIG. 2. Accordingly, the geographic coordinates are encoded with the first character being "x".

Next, the area to which "x" is assigned is divided into thirty two areas of wide (longitude)×4 and height (latitude)×8 as shown in FIG. 3, and to each of the respective divided areas, a character among the predetermined thirty-two half-width alphanumeric characters by the base 32 is assigned, in addition to the first character "x". In the example of FIG. 3, the geographic coordinates are within the range of a rectangular area (latitude 33.75 to 39.375, longitude 135 to 146.25) to which "n" is assigned in addition to the character "x", among the area divided into thirty-two areas at the second time. Accordingly, the geographic coordinates are encoded as two characters "xn" in which the second character "n" is added to the first character "x".

Hereafter, the area is divided into thirty-two areas in the following manner odd number times: wide×8, height×4
even number times: height×4, wide×8
and a character based on base 32, obtained each time, is added to the right side of the encoded character string.

As a result of hierarchical division as described above, an area on the map may be expressed by an area represented by
eight characters (divided into eight=40 bits): 19 m×30 m
ten characters (divided into ten=50 bits): 60 cm×97 cm
twelve characters (divided into twelve=60 bits): 2 cm×3 cm.

For example, in the case of encoding geographic coordinates expressed by latitude 35.685 and longitude 139.75 in Tokyo to ten-digit Geohash, it is expressed as "xn77h06b5n". This indicates that the geographic coordinates are included in an area having a size of 60 cm×97 cm within a range of latitude 35.6849992275238 to 35.6850045919418 and longitude 139.749999046326 to 139.750009775162.

By the Geohash encoding as described above, as the number of digits of a Geohash character string is larger, a rectangular area represented thereby decreases and the precision is higher. On the contrary, when characters are deleted sequentially from the right end of a character string, a rectangular area represented by the Geohash increases and the precision is lower. In this way, with use of Geohash, it is possible to express a geographic range with arbitrary precision according to the number of digits of a character string. For example, a twelve-digit Geohash character string is able to represent a 2 cm×3 cm area in the whole world.

Further, by Geohash encoding, it is possible to know whether or not an area is included according to a prefix match. For example, it is found that the area of "xn77h06b5n" described above is included in each area of "x", "xn7", "xn77", . . . . With this nature, it is easy to handle in the case of collecting data by the area.

In Geohash encoding, as a character is selected from thirty-two characters, 5 bits is required to represent one character because $2^5=32$. As such, in order to perform Geohash encoding on eight digits to twelve digits, a data amount ranging from 5 bits×8 digits=40 bits to 5 bits×12 digits=60 bits is required. In the present embodiment, the sub CPU 102 in FIG. 1 divides the respective geographic coordinates (latitude and longitude data), output from the GPS positioning sensor 101, into two points, and assigns the geographic coordinates of the two points to an area which corresponds most to the geographic coordinates of the two point, among the areas obtained by division through the Geohash encoding described above, and encodes them. This is called first encoding. The sub CPU 102 functions as a first encoding unit configured to perform the first encoding process (S602 of FIG. 6).

Figure 4:
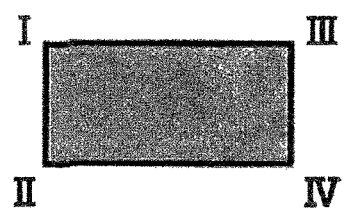
FIG. 4 is an explanatory diagram of vertexes of four corners of a rectangular area.

Next, the sub CPU 102 determines two vertexes of the four corners of the area assigned by the first encoding process to which the geographic coordinates of the two points correspond most, and encodes the information of the pair of vertexes determined FIG. 4 is an explanatory diagram of the vertexes of the four corners of an area. As shown in FIG. 4, when the vertexes of the four corners are named I, II, III, and IV, respectively, two points of the vertexes of the four corners are classified as shown below, and values are assigned respectively. It should be noted that as there is a case where the last output from the GPS positioning sensor 101 is not two points but one point, the case of using only one point of the vertexes of the four corners is also classified.

Only I: 0×0, I→II: 0×1, I→III: 0×2, I→IV: 0×3
Only II: 0×4, II→I: 0×5, II→III: 0×6, II→IV: 0×7
Only III: 0×8, III→I: 0×9, III→II: 0×a, III→IV: 0×b
Only IV: 0×c, IV→I: 0×d According to the classification described above, two points or one point to be used, of the vertexes of the four corners of an area, can be represented by values from 0×0 to 0×d ("0×" is a sign indicating that the following value is a hexadecimal value).

For example, if the geographic coordinates of two points correspond to the vertexes I and III most, information of the pair of vertexes can be encoded as a value 0×2 according to the classification described above. As the classification includes fourteen classes, the number of bits required for encoding is 4 bits because $2^4=16$. This is called second encoding. The sub CPU 102 also functions as a second encoding unit configured to perform the second encoding process (step S603 of FIG. 6).

Here, in the first encoding process, the number of digits of the encoded Geohash depends on the hierarchy of the area, obtained through division by Geohash encoding, to which the geographic coordinates of the two points correspond most. Accordingly, the sub CPU 102 also encodes digit number information regarding the number of digits of the character string encoded in the first encoding process (step S604 of FIG. 6). This is called third encoding. The sub CPU 102 also functions as a third encoding unit configured to perform the third encoding process. In this case, as fifteen digits are sufficient for the precision of geographic coordinates, the number of bits required for the third encoding is 4 bits because $2^4=16$. For example, in the case where geographic coordinates of any two points are encoded to ten-digit Geohash "xn77h06b5n", a value "0×a" indicating ten digits is obtained as a sign indicating the number of digits, by the third encoding process.

In this way, in the present embodiment, with respect to the geographic coordinates of each of two points or one point obtained by dividing the latitude and longitude data, obtained from the GPS positioning sensor 101, into two points, first, code data (hereinafter referred to as "Geohash code data") of about 40 to 60 bits for example, indicating an area which corresponds most to the geographic coordinates of the two points or one point, among the areas obtained by hierarchical division through Geohash by the first encoding process, is calculated. Then, by the second encoding process, 4-bit code data (hereinafter referred to as "vertex pair code data") indicating information of a pair of vertexes of the two points or one point to which the geographic coordinates of the two points or one point correspond most, among the vertexes of the four corners of the area assigned in the first encoding process, is calculated. Further, by the third encoding process, 4-bit code data (hereinafter referred to as "digit number code data"), indicating the number of digits of the Geohash code data obtained by the first encoding process, is calculated.

The sub CPU 102 in FIG. 1 places the Geohash code data, the vertex pair code data, and the digit number code data, calculated as described above, in the order of [digit number code data] [vertex pair code data] [Geohash code data], outputs the resultant code data as code data corresponding to the geographic coordinates of the two points or one point, and accumulates it in the primary cache memory 103 via the first bus 107 in FIG. 1 (step S605 in FIG. 6).

A difference in data amount between the case of using Geohash code data as in the present embodiment and the case of using latitude and longitude data as it is will be described using FIGS. 9A to 9C.

Figure 9A:
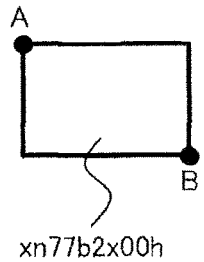
FIGS. 9A to 9C are explanatory diagrams illustrating a difference in data amount between the case of using Geohash code data and the case of using latitude and longitude data as it is.
Figure 9B:
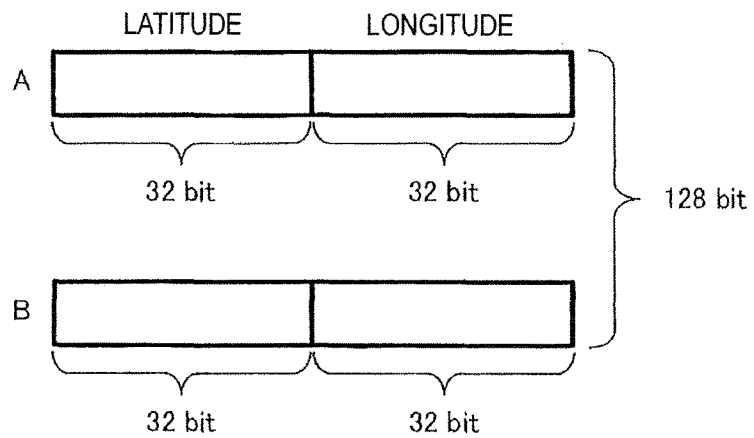
Figure 9C:
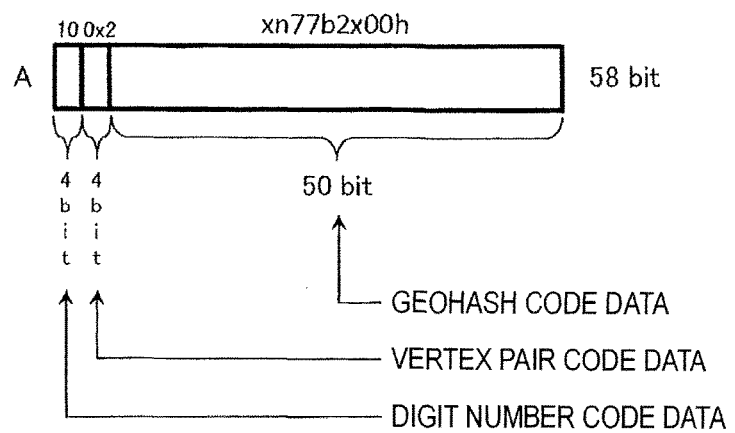

For example, in the case of representing geographic coordinates A and B of two points as shown in FIG. 9A, 16 bytes (128 bits) are required conventionally because 8 bytes (64 bits) are required to represent geographic coordinates of one point (FIG. 9B). Assuming that the geographic coordinates of the two points are converted to Geohash code data, and that digit number code data="0×a" (10 digits), vertex pair code data="0×2" (vertexes I→III in FIG. 4), Geohash code data="xn77h06b5n" are calculated, the code data output from the sub CPU 102 is "a2xn77h06b5n". The first character "a" from the left end is 4-bit digit number code data in hexadecimal representation, the next character "2" is 4-bit vertex pair code data in hexadecimal representation, and the remaining "xn77h06b5n" is 50-bit Geohash code data. Accordingly, the data amount of the code data is 64 bits in total in which 6-bit padding bits are added to 4 bits+4 bits+50 bits (FIG. 9C). As described above, the data amount of the Geohash code data is at most about 60 bits.

As described above, in the present embodiment, geographic coordinates (latitude and longitude data) of two points can be represented by 4 bits+4 bits+40 to 60 bits=48 to 68 bits. As such, although 8 bytes (64 bits) have been required to represent geographic coordinates of one point conventionally, the data amount required for encoding geographic coordinates can be reduced.

Figure 5:
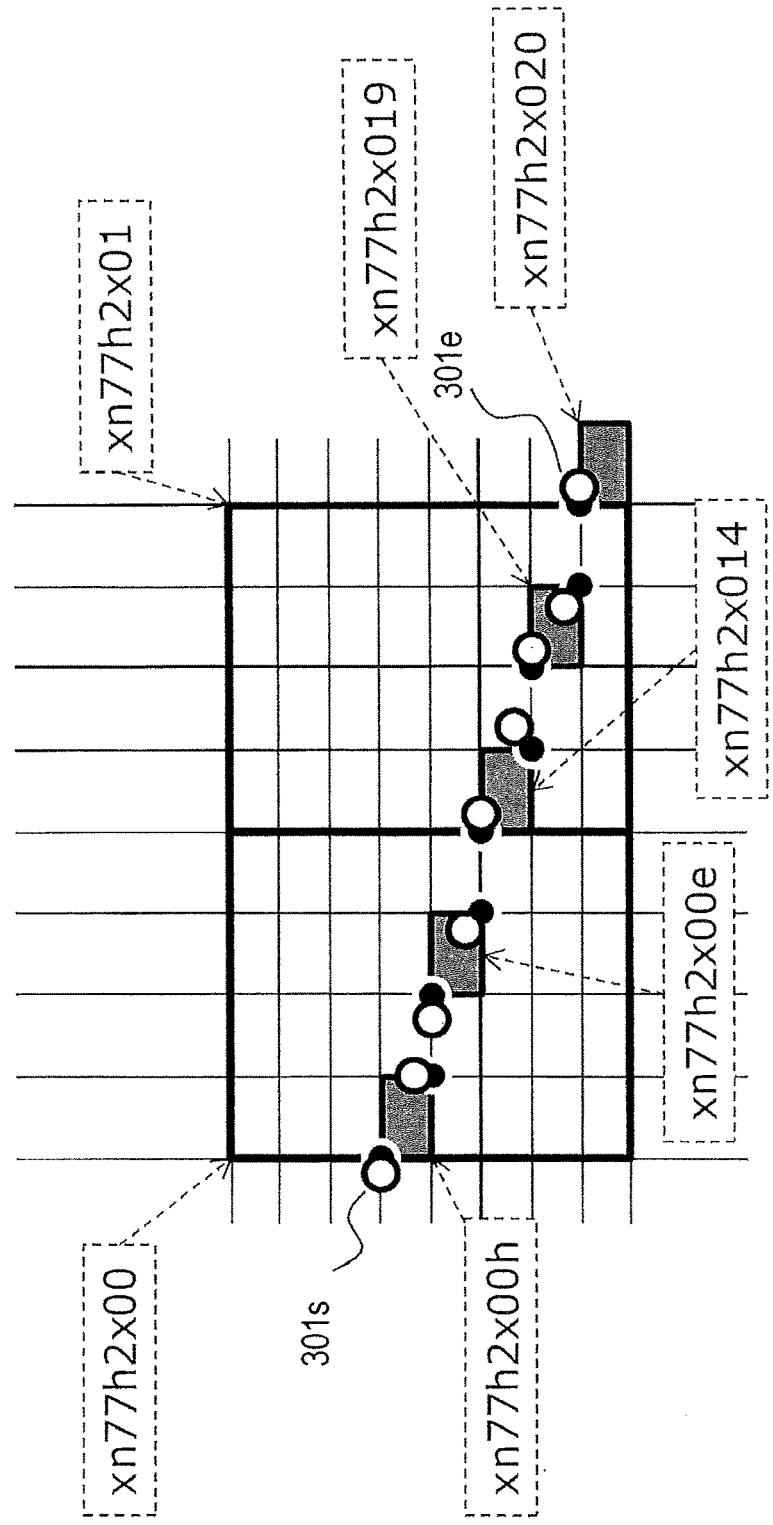
FIG. 5 is an explanatory diagram illustrating an example of encoding geographic coordinates of each two points.

FIG. 5 is an explanatory diagram illustrating an example of encoding geographic coordinates of each two points. In FIG. 5, it is assumed that a user carrying the terminal unit 100 of FIG. 1 goes walking, so that pieces of GPS data (latitude and longitude data) output from the positioning sensor 101 are shown by white circles with black edges. Further, respective Geohash areas associated with geographic coordinates (latitude and longitude data) of the respective two points, by the first encoding process performed by the sub CPU 102 in FIG. 1, are shown as being filled with gray. Further, two pairs of vertexes on the respective areas associated with the geographic coordinates of the respective two points, by the second encoding process performed by the sub CPU 102, are shown by black circles with white edges. In addition, respective pieces of Geohash code data of the respective areas and the upper layer areas thereof associated with the geographic coordinates of the respective two points, by the first encoding process performed by the sub CPU 102, are shown by character strings each surrounded by a broken-line frame. To the Geohash code data calculated by the first encoding process described above, the sub CPU 102 adds the digit number code data calculated by the third encoding process, and the vertex pair code data calculated by the second encoding process. Consequently, as pieces of code data obtained by encoding the divided two points of the geographic coordinates from 301s to 301e in FIG. 5 respectively, the sub CPU 102 outputs five pieces of code data, namely "a3xn77h2x00h", "a3xn77h2x00e", "a3xn77h2x014", "a3xn77h2x019", and "a3xn77h2x020" sequentially to the primary cache memory 103.

With the five pieces of code data, data obtained by quantizing the GPS data of the white circles of the nine points in FIG. 5 to vertex data of the black circles of the nine points in FIG. 5 can be transmitted. The data amount required for one piece of code data is 64 bits=8 bytes in total in which 6-bit padding bits are added to 4 bits (digit number code data)+4 bits (vertex pair code data)+50 bits (Geohash code data), as described above. As such, the data amount required for recording or transmitting the five pieces of data is 8 bytes×5=40 bytes. Meanwhile, the data amount having been required for recording or transmitting one piece of GPS data conventionally is about 8 bytes. As such, to record or transmit GPS data of nine points, a data amount of 8 bytes×9=72 bytes has been required. Accordingly, in the present embodiment, it is possible to record or transmit GPS data with the data amount of 40÷72×100=about 56%, compared with the case of conventional technology. It should be noted that when the gray rectangular areas shown by the Geohash code data in FIG. 5 are sufficiently small, sufficient precision can be secured for the data obtained by quantizing the GPS data of the white circles of the nine points to the vertex data of the black circles of the nine points.

FIG. 6 is a flowchart illustrating an example of a geographic coordinate encoding process by the sub CPU 102 in FIG. 1. This process is realized such that the sub CPU 102 executes a geographic coordinate encoding program stored in a built-in memory not shown. The program may be installed from a portable storage medium to the memory via a portable storage medium drive, not shown, included in the terminal unit 100 and executed, or may be downloaded from a server computer or the like, not shown, on the network via the WLAN I/F 106 to be installed in the memory and executed.

First, the sub CPU 102 sequentially acquires GPS data (latitude and longitude data) from the positioning sensor 101 via the first bus 107 (step S601).

Next, the sub CPU 102 divides the GPS data, acquired sequentially, into two points, performs the first encoding process, the second encoding process, and the third encoding process described above as Geohash-based encoding, on the GPS data of the two points, and outputs code data (digit number code data+vertex pair code data+Geohash code data) corresponding to the GPS data of the two points (steps S602 to S604).

Then, the sub CPU 102 sequentially accumulates the code data, output at step S602, in the primary cache memory 103 via the first bus 107 (step S605).

Then, the sub CPU 102 returns to the process of step S601, and continues acquisition and encoding of GPS data.

Figure 7:
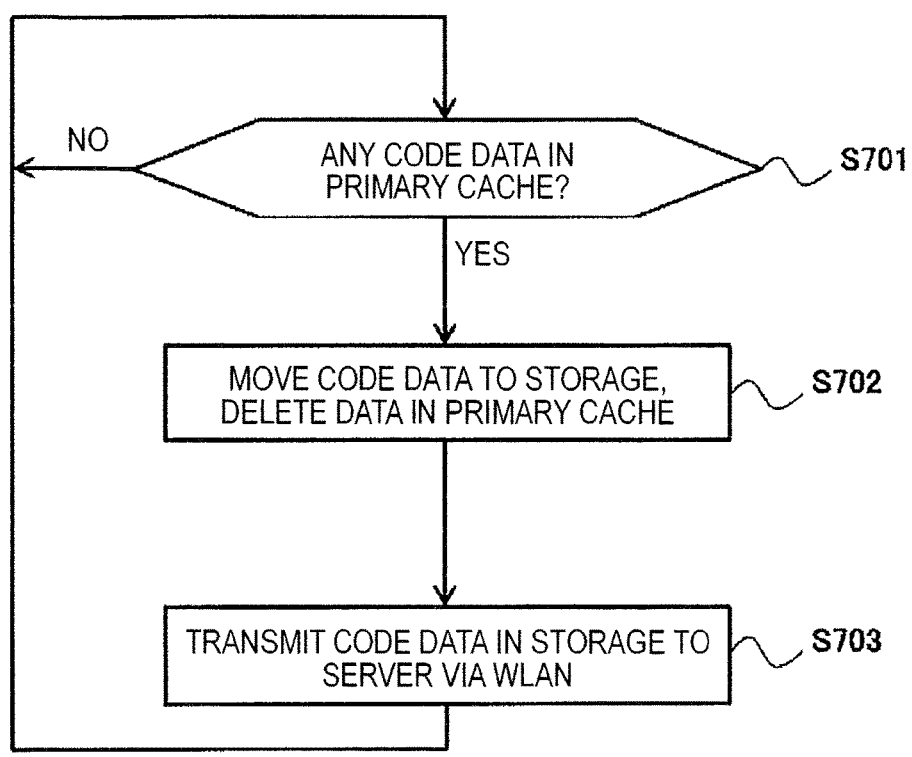
FIG. 7 is a flowchart illustrating an exemplary process of acquiring and transmitting geographic coordinate code data by a CPU.

FIG. 7 is a flowchart illustrating an exemplary process of acquiring and transmitting geographic coordinate code data by the CPU 201 in FIG. 1.

First, the CPU 201 repeats a standby state until a certain amount of code data is accumulated in the primary cache memory 103 via the second bus 108 every time which is several times to several tens of times longer than the interval of GPS data processing performed by the sub CPU 102 (repeat NO determination at step S701).

When determination at step S701 is YES, the CPU 201 moves the code data accumulated in the primary cache memory 103 to the storage 105 via the second bus 108, and deletes the code data in the primary cache memory 103 (step S702).

Then, the CPU 201 transmits the code data in the storage 105 to a server computer, not shown, through a local area network (LAN) or the Internet via the WLAN I/F 106 (step S703). Then, the CPU 201 returns to the standby process of step S701.

Figure 8:
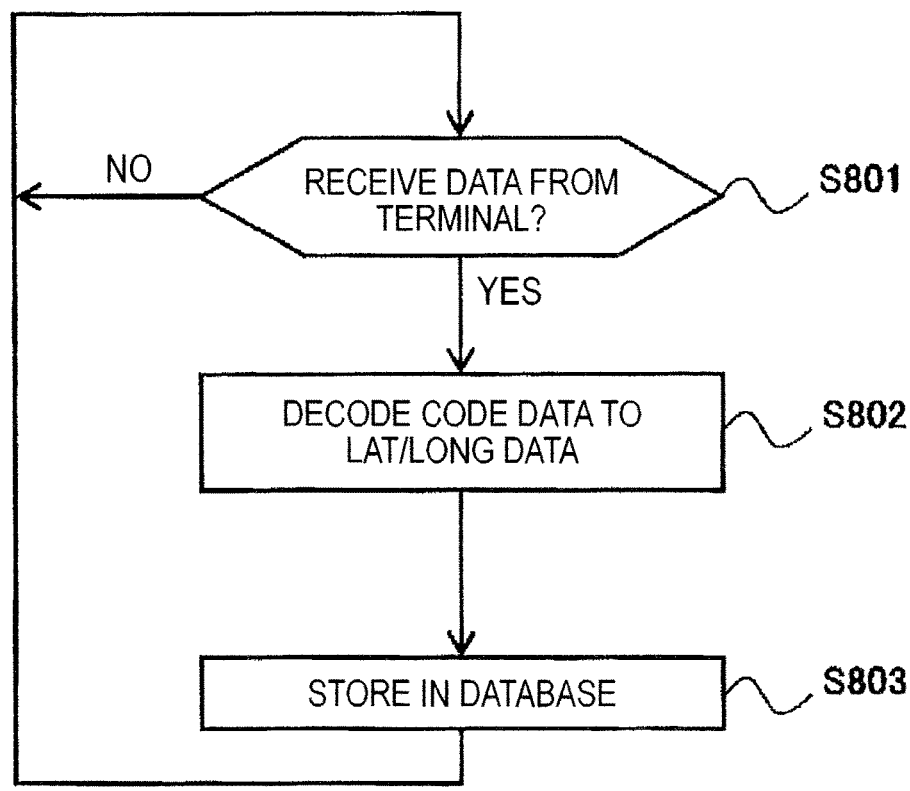
FIG. 8 is a flowchart illustrating an example of a geographic coordinate decoding process by a server computer.

FIG. 8 is a flowchart illustrating an example of a geographic coordinate decoding process by a server computer. This process is performed such that a central processing unit (CPU) of a server computer (hereinafter referred to as a "server CPU"), not shown, executes a geographic coordinate decoding program stored in a memory, not shown, in the server computer. This program may be installed from a portable storage medium to the memory via a portable storage medium drive, not shown, included in the server computer and executed, or may be downloaded from another server computer or the like, not shown, on the network via a network interface in the server computer to be installed in the memory and executed.

The server CPU maintains a standby state until it receives code data from the terminal unit 100 in FIG. 1 (repeat NO determination at step S801).

Upon receipt of code data from the terminal unit 100, the server CPU performs a geographic coordinate decoding process on the code data to decode the latitude and longitude data (step S802). As described above, the code data is in a form of [digit number code data] [vertex pair code data] [Geohash code data]. As such, digit number code data is extracted from the first 4 bits of the received code data, vertex pair code data is extracted from the next 4 bits, and further, Geohash code data of the number of bits of the number of digits indicated by the digit number code data is extracted. From the Geohash code data, as the range of latitude and longitude of the corresponding area can be known as described in FIGS. 2 and 3, geographic coordinates (latitude and longitude data) of the vertexes of the four corners of the area can also be known. Then, by decoding the vertex pair code data, as the vertexes of two points or one point on the area corresponding to the black circle in FIG. 5 can also be known, latitude and longitude data decoded as geographic coordinates of the vertexes are obtained.

The server CPU accumulates the latitude and longitude data, decoded at step S802, in a database, not shown, in the server computer, and allows various types of applications to access it (step S803). Then, the CPU 201 returns to the standby process of step S801.

In the embodiment described above, it is possible to further reduce the data amount required for GPS data by causing the sub CPU 102 in FIG. 1 to perform intermittent operation when acquiring GPS data from the positioning sensor 101.

As described above, it is possible to realize further compression of information of geographic coordinates by using Geohash. As the data amount of GPS data can be reduced, it is possible to store a larger amount of data in the terminal unit 100 compared with the conventional cases. Further, as the data amount of GPS data to be transmitted to the server computer can be reduced, it is also possible to realize reduction of the load on the server computer at the time of communications.

Further, while Geohash is used as a system of encoding geographic coordinates in the present embodiment, the present invention is not limited to this.

Further, while a rectangle is used as the shape of an area in the present embodiment, the shape is not limited to this. Polygonal shapes including square and triangle may be used. In that case, as coordinates specifying such an area, vertex coordinates or center coordinates of a polygon may be used. Further, the shape of an area is not limited to a polygon, but may be a round. In that case, as coordinates specifying such an area, center coordinates of the area or coordinates representing any position on the circumference thereof may be used.

What is claimed is:

1. A geographic coordinate encoding device comprising a processor, wherein the processor performs:

a first encoding process of determining, from among a plurality of areas obtained by hierarchically dividing a geographic range, an area with vertex coordinates, to any of which at least one of two points of geographic coordinates detected by a sensor corresponds, and encoding data representing the determined area, wherein the two points are placed next to each other; and an output process of outputting code data encoded by the first encoding process.

2. The geographic coordinate encoding device according to claim 1, wherein the processor further performs:
a second encoding process of encoding information of a pair of the geographic coordinates of the two points determined as vertex coordinates, and a third encoding process of encoding a number of digits of information encoded by the first encoding process, and
wherein the output process includes outputting code data obtained by the second encoding process and code data obtained by the third encoding process along with the code data encoded by the first encoding process.

3. The geographic coordinate encoding device according to claim 2, wherein the second encoding process includes determining which vertex coordinates of the area correspond to the two points.

4. The geographic coordinate encoding device according to claim 1, wherein:
the geographic coordinates represent latitude and longitude, and
in the first encoding process, the processor performs a process of encoding information representing the determined area in a Geohash form.

5. A terminal unit comprising:
a sensor detecting the geographic coordinates, and
the geographic coordinate encoding device according to claim 1.

6. The terminal unit according to claim 5, wherein the sensor detecting the geographic coordinates includes a GPS sensor.

7. A geographic coordinate decoding device that decodes data, output from the geographic coordinate encoding device according to claim 1, into geographic coordinates representing latitude and longitude of each of the two points.

8. The geographic coordinate encoding device according to claim 1, wherein the area is a polygonal area, and the geographic coordinates of the two points represent vertex coordinates of the polygonal area.

9. A non-transitory computer-readable storage medium storing a program for causing a computer, used as a geographic coordinate decoding device, to perform:
a process of decoding information, output from the geographic coordinate encoding device according to claim 1, into geographic coordinates representing latitude and longitude of each of the two points.

10. A geographic coordinate encoding method used by a geographic coordinate encoding device including a processor, the method comprising, by the processor:
determining, from among a plurality of areas obtained by hierarchically dividing a particular geographic range, an area with vertex coordinates, to any of which at least one of two points of geographic coordinates detected by a sensor corresponds, and encoding data representing the determined area, wherein the two points are placed next to each other; and
outputting code data encoded by the first encoding process.

11. The geographic coordinate encoding method according to claim 10, further comprising, by the processor:
encoding data representing positions of the geographic coordinates of the two points determined; and
encoding a number of digits of information obtained by encoding the data representing the determined area,
wherein the outputting data includes outputting code data obtained by encoding the data representing the positions of the coordinates of the two points, and code data obtained by encoding the number of digits of the information obtained by encoding the data representing the determined area along with the code data encoded by the first encoding process.

12. The geographic coordinate encoding method according to claim 11, wherein said encoding the data representing the positions of the geographic coordinates includes determining which vertex coordinates of the area correspond to the two points.

13. The geographic coordinate encoding method according to claim 10, wherein:
the geographic coordinates represent latitude and longitude, and
the encoding data representing the determined area is performed in a Geohash form.

14. The geographic coordinate encoding method according to claim 10, wherein the area is a polygonal area, and the geographic coordinates of the two points represent vertex coordinates of the polygonal area.

15. A geographic coordinate decoding method used by a geographic coordinate decoding device, the method comprising, by the geographic coordinate decoding device, decoding information, output from the geographic coordinate encoding device according to claim 10, into geographic coordinates representing latitude and longitude of each of the two points.

16. A non-transitory computer-readable storage medium storing a program for causing a computer, used as a geographic coordinate encoding device, to perform:
a first encoding process of determining, from among a plurality of areas obtained by hierarchically dividing a particular geographic range, an area with vertex coordinates, to any of which at least one of two points of geographic coordinates detected by a sensor corresponds, and encoding data representing the determined area, wherein the two points are placed next to each other; and
an outputting process of outputting data encoded by the first encoding process.

17. The storage medium according to claim 16, the storage medium storing a program for causing the computer to further perform:
a second encoding process of encoding information of a pair of the geographic coordinates of the two points determined as vertex coordinates, and
a third encoding process of encoding a number of digits of information encoded by the first encoding process,
wherein the outputting process includes code data obtained by the second encoding process, and code data obtained by the third encoding process along with the code data obtained by the first encoding process.

18. The storage medium according to claim 17, wherein the second encoding process includes determining which vertex coordinates of the area correspond to the two points.

19. The storage medium according to claim 16, wherein the geographic coordinates represent latitude and longitude, and
the program causes the computer to perform, in the first encoding process, a process of encoding information representing the determined area in a Geohash form.

20. The storage medium according to claim 16, wherein the area is a polygonal area, and the geographic coordinates of the two points represent vertex coordinates of the polygonal area.

* * * * *